US007035409B1

(12) United States Patent
Moskowitz

(10) Patent No.: US 7,035,409 B1
(45) Date of Patent: Apr. 25, 2006

(54) MULTIPLE TRANSFORM UTILIZATION AND APPLICATIONS FOR SECURE DIGITAL WATERMARKING

(76) Inventor: Scott A. Moskowitz, 16711 Collins Ave. #2505, Miami, FL (US) 33160

( * ) Notice: Subject to any disclaimer, the term of this patent is extended or adjusted under 35 U.S.C. 154(b) by 945 days.

(21) Appl. No.: 09/644,098

(22) Filed: Aug. 23, 2000

Related U.S. Application Data

(62) Division of application No. 09/053,628, filed on Apr. 2, 1998, now Pat. No. 6,205,249.

(51) Int. Cl.
*G09C 3/00* (2006.01)
*G06K 9/36* (2006.01)

(52) U.S. Cl. .......................................... 380/54; 382/232

(58) Field of Classification Search ........ 380/200–210, 380/54; 713/176; 382/232
See application file for complete search history.

(56) References Cited

U.S. PATENT DOCUMENTS

| 4,200,770 | A | 4/1980 | Hellman et al. |
| 4,218,582 | A | 8/1980 | Hellman et al. |
| 4,405,829 | A | 9/1983 | Rivest et al. |
| 4,424,414 | A | 1/1984 | Hellman et al. |
| 4,827,508 | A | 5/1989 | Shear |
| 4,977,594 | A | 12/1990 | Shear |
| 4,979,210 | A | 12/1990 | Nagata et al. |
| 5,050,213 | A | 9/1991 | Shear |
| 5,073,925 | A | 12/1991 | Nagata et al. |
| 5,410,598 | A | 4/1995 | Shear |
| 5,530,739 | A | 6/1996 | Okada et al. |
| 5,613,004 | A | 3/1997 | Cooperman et al. |
| 5,664,018 | A | 9/1997 | Leighton |
| 5,832,119 | A | 11/1998 | Rhoads |
| 6,205,249 | B1 * | 3/2001 | Moskowitz ............ 382/232 |
| 6,611,599 | B1 * | 8/2003 | Natarajan ............ 380/203 |

OTHER PUBLICATIONS

U.S. Appl. No. 08/587,943, "Method for Stega-Cipher Protection of Computer Code".
U.S. Appl. No. 08/775,216, "Steganographic Method and Device".
U.S. Appl. No. 08/587,944, "Human Assisted Random Key Generation . . . ".
U.S. Appl. No. 08/677,435, "Optimization Methods for the Insertion, Protection and . . . ".
U.S. Appl. No. 08/772,222, "Z-Transform Implementation of Digital Watermarks".

(Continued)

Primary Examiner—Hosuk Song

(57) ABSTRACT

Multiple transform utilization and applications for secure digital watermarking. In one embodiment of the present invention, digital blocks in digital information to be protected are transformed into the frequency domain using a fast Fourier transform. A plurality of frequencies and associated amplitudes are identified for each of the transformed digital blocks and a subset of the identified amplitudes is selected for each of the digital blocks using a primary mask from a key. Message information is selected from a message using a transformation table generated with a convolution mask. The chosen message information is encoded into each of the transformed digital blocks by altering the selected amplitudes based on the selected message information.

8 Claims, 3 Drawing Sheets

OTHER PUBLICATIONS

Fabien A.P. Peticolas, Ross J. Anderson and Markkus G. Kuhn, "Attacks on Copyright Marking Systems," Dec. 1997.

Joseph J.K. O Ruanaidh and Thierry Pun, "Rotation, Scale and Translation Invariant Digital Image Watermarking".

Scott Craver et al., "Can Invisible Watermarks Resolve Rightful Ownership?," (Jul. 25, 1996).

Ross Anderson, "Stretching the Limits of Steganography".

Joseph Ruanaidh, Rotation, Scale and Translation Invariant Digital Image Watermarking, IEEE conference, pp. 1-4.

Fabien A.P. Peticolas, Ross J. Anderson and Markkus G. Kuhn, "Attacks on Copyright Marking Systems," Dec. 1997.

Scott Craver et al., "Can Invisible Watermarks Resolve Rightful Ownership?," Jul. 25, 1996.

Ross Anderson, "Stretching the Limits of Steganography".

Delaigle, J.F., et al., "Digital Watermarking," Proceedings of the SPIE, vol. 2659, Feb. 1, 1996, pp. 99-110, Abstract.

Schnieder, M. et al., "Robust Content Based Digital Signature For Image Authentication," Proceedings of the Int'l. Conf. on Image Processing, Sep. 16-19, 1996 vol. 3, 16, pp. 227-230.

Cox, I.J. et al., "Secure Spread Spectrum Watermarking for Multimedia," IEEE Transactions On Image Processing, vol. 6, No. 12, Dec. 1, 1997, pp. 1673-1686.

Cox, I.J. et al., "Secure Spread Spectrum Watermarking for Multimedia," NEC Research Institute, Technical Report 95-10, pp. 1-33.

Wong, Ping Wah, "A Public Key Watermark for Image Verification and Authentication," IEEE Int'l. Conf. on Image Processing, vol. 1, Oct. 4-7, 1998, pp. 455-459.

* cited by examiner ic value of the content. By way of example, a picture
MULTIPLE TRANSFORM UTILIZATION AND APPLICATIONS FOR SECURE DIGITAL WATERMARKING This application is a divisional of U.S. patent application Ser. No. 09/053,628 filed Apr. 2, 1998, now U.S. Pat. No. 6,205,249, issued Mar. 20, 2001.

CROSS-REFERENCE TO RELATED APPLICATIONS

This application claims the benefit of U.S. patent application Ser. No. 08/587,943, filed Jan. 17, 1996, entitled "Method for Stega-Cipher Protection of Computer Code," the entire disclosure of which is hereby incorporated by reference U.S. Pat. No. 5,745,569.

FIELD OF THE INVENTION

The invention relates to the protection of digital information. More particularly, the invention relates to multiple transform utilization and applications for secure digital watermarking.

BACKGROUND OF THE INVENTION

Increasingly, commercially valuable information is being created and stored in "digital" form. For example, music, photographs and video can all be stored and transmitted as a series of numbers, such as 1's and 0's. Digital techniques let the original information be recreated in a very accurate manner. Unfortunately, digital techniques also let the information be easily copied without the owner's permission.

Digital watermarks exist at a convergence point where creators and publishers of digitized multimedia content demand local, secure identification and authentication of content. Because piracy discourages the distribution of valuable digital information, establishing responsibility for copies and derivative copies of such works is important. The goal of a digital watermark system is to insert a given information signal or signals in such a manner as to leave little or no artifacts, with one standard being perceptibility, in the underlying content signal, while maximizing its encoding level and "location sensitivity" in the signal to force damage to the content signal when removal is attempted. In considering the various forms of multimedia content, whether "master," stereo, National Television Standards Committee (NTSC) video, audio tape or compact disc, tolerance of quality will vary with individuals and affect the underlying commercial and aesthetic value of the content. It is desirable to tie copyrights, ownership rights, purchaser information or some combination of these and related data into the content in such a manner that the content undergoes damage, and therefore reduction of its value, with subsequent unauthorized distribution, commercial or otherwise. Digital watermarks address many of these concerns and research in the field has provided a rich basis for extremely robust and secure implementations.

Of particular concern is the balance between the value of a digitized "piece" of content and the cost of providing worthwhile "protection" of that content. In a parallel to real world economic behavior, the perceived security of a commercial bank does not cause people to immediately deposit cash because of the expense and time required to perform a bank deposit. For most individuals, possession of a US $100 bill does not require any protection beyond putting it into a wallet. The existence of the World Wide Web, or "Web," does not implicitly indicate that value has been created for media which can be digitized, such as audio, still images and other media. The Web is simply a medium for information exchange, not a determinant for the commercial value of content. The Web's use to exchange media does, however, provide information that helps determine this value, which is why responsibility over digitized content is desirable. Note that digital watermarks are a tool in this process, but they no not replace other mechanisms for establishing more public issues of ownership, such as copyrights. Digital watermarks, for example, do not replace the "historical average" approach to value content. That is, a market of individuals willing to make a purchase based solely on the perceived value of the content. By way of example, a picture distributed over the Internet, or any other electronic exchange, does not necessarily increase the underlying value of the picture, but the opportunity to reach a greater audience by this form of "broadcast" may be a desirable mechanism to create "potentially" greater market-based valuations. That decision rests solely with the rights holder in question.

Indeed, in many cases, depending on the time value of the content, value may actually be reduced if access is not properly controlled. With a magazine sold on a monthly basis, it is difficult to assess the value of pictures in the magazine beyond the time the magazine is sold. Compact disc valuations similarly have time-based variables, as well as tangible variables such as packaging versus the packageless electronic exchange of the digitized audio signals. The Internet only provides a means to more quickly reach consumers and does not replace the otherwise "market-based" value. Digital watermarks, properly implemented, add a necessary layer of ownership determination which will greatly assist in determining and assessing value when they are "provably secure." The present invention improves digital watermarking technology while offering a means to properly "tamper proof" digitized content in a manner analogous to methods for establishing authenticity of real world goods.

A general weakness in digital watermark technology relates directly to the way watermarks are implemented. Too many approaches leave detection and decode control with the implementing party of the digital watermark, not the creator of the work to be protected. This fundamental aspect of various watermark technologies removes proper economic incentives for improvement of the technology when third parties successfully exploit the implementation. One specific form of exploitation obscures subsequent watermark detection. Others regard successful over encoding using the same watermarking process at a subsequent time.

A set of secure digital watermark implementations address this fundamental control issue, forming the basis of "key-based" approaches. These are covered by the following patents and pending applications, the entire disclosures of which are hereby incorporated by reference: U.S. Pat. No. 5,613,004 entitled "Steganographic Method and Device" and its derivative U.S. patent application Ser. No. 08/775,216, U.S. patent application Ser. No. 08/587,944 entitled "Human Assisted Random Key Generation and Application for Digital Watermark System," U.S. patent application Ser. No. 08/587,943 entitled "Method for Stega-Cipher Protection of Computer Code," U.S. patent application Ser. No. 08/677,435 entitled "Optimization Methods for the Insertion, Protection, and Detection of Digital Watermarks in Digitized Data," and U.S. patent application Ser. No. 08/772,222 entitled "Z-Transform Implementation of Digital Watermarks." Public key crypto-systems are described in U.S. Pat. Nos. 4,200,770, 4,218,582, 4,405,829 and 4,424,414, the entire disclosures of which are also hereby incorporated by reference.

By way of improving these digital watermark security methods, utilization of multiple transforms, manipulation of signal characteristics and the requisite relationship to the mask set or "key" used for encoding and decoding operations are envisioned, as are optimized combinations of these methods. While encoding a watermark may ultimately differ only slightly in terms of the transforms used in the encoding algorithm, the greater issues of an open, distributed architecture requires more robust approaches to survive attempts at erasure, or even means for making detection of the watermark impossible. These "attacks," when computationally compared, may be diametrically related. For instance, cropping and scaling differ in signal processing orientation, and can result in the weakening of a particular watermarking approach but not all watermarking approaches.

Currently available approaches that encode using either a block-based or entire data set transform necessarily encode data in either the spatial or frequency domains, but never both domains. A simultaneous crop and scale affects the spatial and frequency domains enough to obscure most available watermark systems. The ability to survive multiple manipulations is an obvious benefit to those seeking to ensure the security of their watermarked media. The present invention seeks to improve on key-based approaches to watermarking previously disclosed, while offering greater control of the subsequently watermarked content to rights owners and content creators.

Many currently available still image watermarking applications are fundamentally different from the key-based implementations. Such products include products offered by Digimarc and Signum, which seek to provide a robust watermark by encoding watermark messages that rely entirely on comparisons with the original image for decode operations. The subsequent result of the transform, a discrete cosine transform performed in blocks, is digital signed. The embedded watermarks lack any relationship to the perceptual qualities of the image, making inverse application of the publicly available decoders a very good first line of attack. Similarly, the encoding process may be applied by third parties, as demonstrated by some robustness tests, using one process to encode over the result of an image watermarked with another process. Nonrepudiation of the watermark is not possible, because Digimarc and Signum act as the repository of all registrations of the image's ownership.

Another line of attack is a low pass filter that removes some of the high frequency noise that has been added, making error-free detection difficult or impossible. Finally, many tests of a simple JPEG transform indicate the watermarks may not survive as JPEG is based on the same transforms as the encoding transforms used by the watermarking process. Other notable implementations, such as that offered by Signafy (developed by NEC researchers), appear to encode watermark messages by performing a transform of the entire image. The goal of this process is to more consistently identify "candidate" watermark bits or regions of the image to encode in perceptually significant regions of the signal. Even so, Signafy relies on the original unwatermarked image to accomplish decoding.

All of these methods still rely on the original unwatermarked image to ensure relatively error-free detection of the watermarks. The steganographic method seeks to provide watermark security without an original unwatermarked copy of the media for decode operations, as well as providing users cryptographic security with ciphered symmetric keys. That is, the same key is used for encode and decode operations. Public key pairs, where each user has a public/private key pair to perform asymmetric encode and decode operations, can also be used. Discussions of public key encryption and the benefits related to encryption are well documented. The growing availability of a public key infrastructure also indicates recognition of provable security. With such key-based implementations of watermarking, security can be off-loaded to the key, providing for a layered approach to security and authentication of the watermark message as well as the watermarked content.

It is known that attacks on the survivability of other implementations are readily available. Interesting network-based attacks on the watermark message are also known which fool the central registration server into assuming an image is owned by someone other than the registered owner. This also substantiates the concern that centralized watermarking technologies are not robust enough to provide proper assurances as to the ownership of a given digitized copy of an multimedia work.

Because the computational requirements of performing multiple transforms may not be prohibitive for certain media types, such as still images and audio, the present invention seeks to provide a means to securely watermark media without the need for an original unwatermarked copy to perform decoding. These transforms may be performed in a manner not plainly evident to observers or the owner of the content, who may assume the watermark is still detectable. Additionally, where a particular media type is commonly compressed (JPEG, MPEG, etc.), multiple transforms may be used to properly set the mask sets, prior to the watermarking process, to alert a user to survivability prior to the release of a watermarked, and thus perceived, "safe" copy to unknown parties. The result of the present invention is a more realistic approach to watermarking taking the media type, as well as the provable security of the keys into consideration. A more trusted model for electronic commerce is therefore possible.

The creation of an optimized "envelope" for insertion of watermarks to establish secured responsibility for digitally-sampled content provides the basis of much watermark security but is also a complementary goal of the present invention. The predetermined or random key that is generated is not only an essential map to access the hidden information signal, but is also the a subset of the original signal making direct comparisons with the original signal unnecessary. This increases the overall security of the digital watermark.

Survival of simultaneous cropping and scaling is a difficult task with image and audio watermarking, where such transformations are common with the inadvertent use of images and audio, and with intentional attacks on the watermark. The corresponding effects in audio are far more obvious, although watermarks which are strictly "frequency-based," such as variations of spread spectrum, suffer from alignment issues in audio samples which have been "cropped," or clipped from the original length of the piece. Scaling is far more noticeable to the human auditory system, though slight changes may affect frequency-only-type watermarks while not being apparent to a consumer. The far greater threat to available audio watermark applications, most of which are variations of frequency-based embedded signaling, are generally time-based transformations, including time-based compression and expansion of the audio signal. Signafy is an example of spread spectrum-based watermarking, as are applications by Solana Technology, CRL, BBN, MIT, etc. "Spatial domain" approaches are more appropriate designations for the technologies deployed by Digimarc, Signum, ARIS, Arbitron, etc. Interestingly, a time-based approached when considered for images is basically a "spatial-based" approach. The pixels are "convolutional." The difference being that the "spread spectrum-ed" area of the frequencies is "too" well-defined and thus susceptible to over-encoding of random noise at the same sub-bands as that of the embedded signal.

Giovanni uses a block-based approach for the actual watermark. However, it is accompanied by image-recognition capable of restoring a scaled image to its original scale. This "de-scaling" is applied before the image is decoded. Other systems used a "differencing" of the original image with the watermarked image to "de-scale." It is clear that de-scaling is inherently important to the survival of any image, audio or video watermark. What is not clear is that the differencing operation is acceptable from a security standpoint. Moreover, differencing that must be carried out by the watermarking "authority," instead of the user or creator of the image, causes the rights owner to lose control over the original unwatermarked content. Aside from utilizing the mask set within the encoding/decoding key/key pair, the original signal must be used. The original is necessary to perform detection and decoding, although with the attacks described above it is not possible to clearly establish ownership over the watermarked content.

In view of the foregoing, it can be appreciated that a substantial need exists for multiple transform utilization and applications for secure digital watermarking that solve the problems discussed above.

SUMMARY OF THE INVENTION

The disadvantages of the art are alleviated to a great extent by multiple transform utilization and applications for secure digital watermarking. In one embodiment of the present invention, digital blocks in digital information to be protected are transformed into the frequency domain using a fast Fourier transform. A plurality of frequencies and associated amplitudes are identified for each of the transformed digital blocks and a subset of the identified amplitudes is selected for each of the digital blocks using a primary mask from a key. Message information is selected from a message using a transformation table generated with a convolution mask. The chosen message information is encoded into each of the transformed digital blocks by altering the selected amplitudes based on the selected message information.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
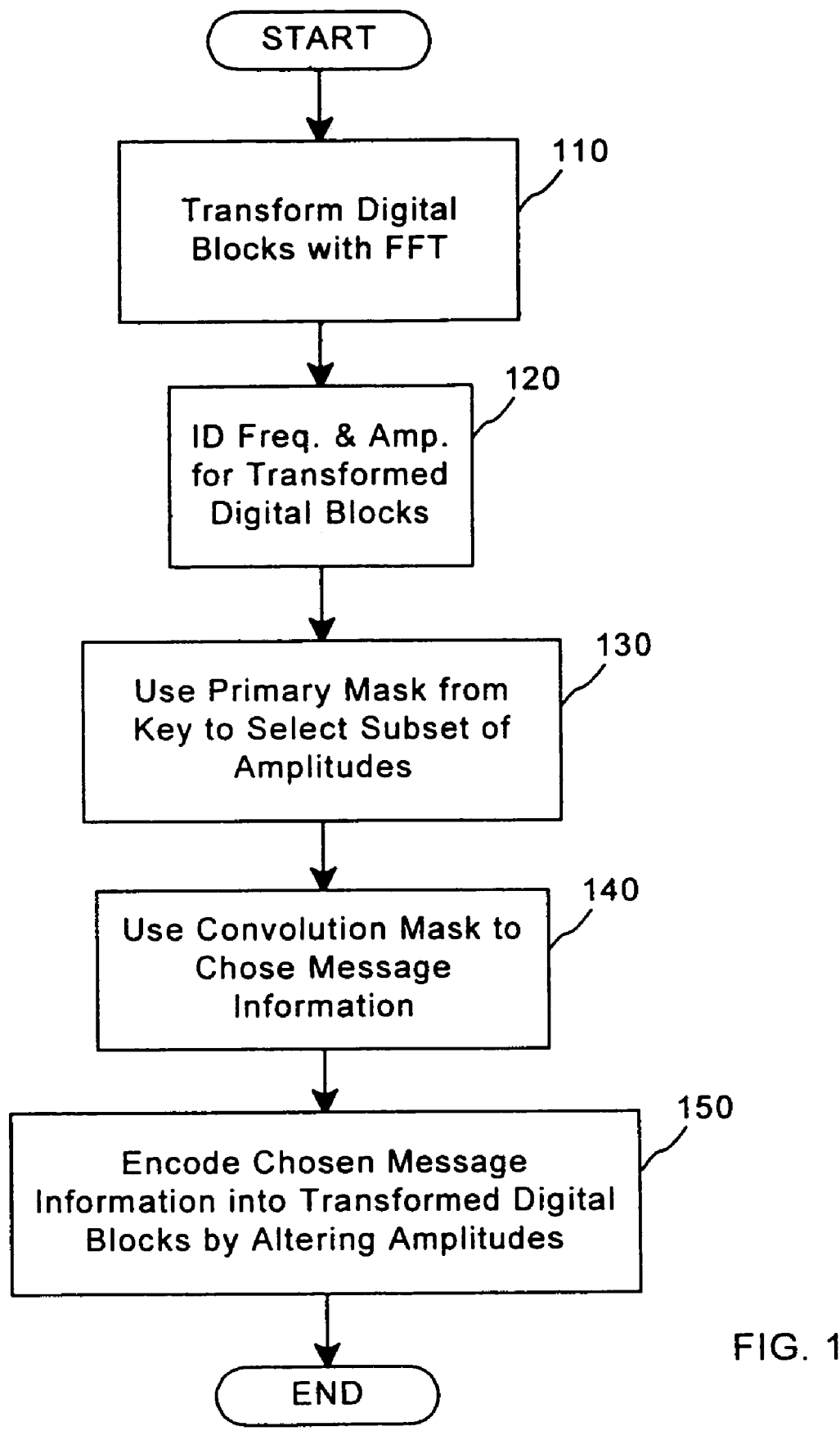
FIG. 1 is a block flow diagram of a method for encoding digital information according to an embodiment of the present invention.

In accordance with an embodiment of the present invention, multiple transforms are used with respect to secure digital watermarking. There are two approaches to watermarking using frequency-domain or spatial domain transformations: using small blocks or using the entire data-set. For time-based media, such as audio or video, it is only practical to work in small pieces, since the entire file can be many megabytes in size. For still images, however, the files are usually much smaller and can be transformed in a single operation. The two approaches each have their own strengths. Block-based methods are resistant to cropping. Cropping is the cutting out or removal of portions of the signal. Since the data is stored in small pieces, a crop merely means the loss of a few pieces. As long as enough blocks remain to decode a single, complete watermark, the crop does not remove the mark. Block-based systems, however, are susceptible to scaling. Scaling, such as affine scaling or "shrinking," leads to a loss of the high frequencies of the signal. If the block size is 32 samples and the data is scaled by 200%, the relevant data now covers 64 samples. However, the decoder still thinks that the data is in 32 samples, and therefore only uses half the space necessary to properly read the watermark. Whole-set approaches have the opposite behavior. They are very good at surviving scaling, since they approach the data as a whole, and generally scale the data to a particular size before encoding. Even a small crop, however, can throw off the alignment of the transform and obscure the watermark.

With the present invention, and by incorporation of previously disclosed material, it is now possible to authenticate an image or song or video with the encoding key/key pair, eliminating false positive matches with cryptography and providing for the communication of a copyright through registration with third party authorities, instead of the original unwatermarked copy.

The present invention provides an obvious improvement over the prior art while improving on previous disclosures by offsetting coordinate values of the original signal onto the key, which are then subsequently used to perform decode or detection operations by the user or authorized "key-holder." This offsetting is necessary with content which may have a watermark "payload," the amount of data that may successfully be encoded, based on Shannon's noisy channel coding theorem, that prevents enough invisible "saturation" of the signal with watermark messages to afford the owner the ability to detect a single message. An example, it is entirely possible that some images may only have enough of a payload to carry a single 100 bit message, or 12 ASCII characters. In audio implementations tested by the present inventor, 1000 bits per second are inaudibly encoded in a 16 bit 44.1 kHz audio signal. Most electronically available images do not have enough data to afford similar "payload" rates. Thus the premise that simultaneous cropping and scaling survival is more difficult for images than a comparable commercially available audio or video track. The added security benefit is that the more limited randomizer of a watermarking system based on spread spectrum or frequency-only applications, the random value of the watermark data "hopping "over a limited signaling band, is that the key is also an independent source of ciphered or random data used to more effectively encode in a random manner. The key may actually have random values larger than the watermark message itself, measured in bits. The watermark decoder is assured that the image is in its original scale, and can decide whether it has been cropped based on its "descaled" dimensions.

The benefits of a system requiring keys for watermarking content and validating the distribution of said content is obvious. Different keys may be used to encode different information while secure one way hash functions, digital signatures, or even one-time pads may be incorporated in the key to secure the embedded signal and afford nonrepudiation and validation of the watermarked image and "its" key/key pair. Subsequently, these same keys may be used to later validate the embedded digital signature only, or fully decode the digital watermark message. Publishers can easily stipulate that content not only be digitally watermarked, but that distributors must check the validity of the watermarks by performing digital signature checks with keys that tack any other functionality.

Some discussion of secure digital watermarking has begun to appear. Leighton describes a means to prevent collusion attacks in digital watermarks in U.S. Pat. No. 5,664,018. Leighton, however, may not actually provide the security described. For example, in particularly instances where the watermarking technique is linear, the "insertion envelope" or "watermarking space" is well-defined and thus susceptible to attacks less sophisticated than collusion by unauthorized parties. Over encoding at the watermarking encoding level is but one simple attack in such linear implementations. Another consideration ignored by Leighton is that commercially-valuable content in many cases may already exist in a unwatermarked form somewhere, easily accessible to potential pirates, gutting the need for any type of collusive activity. Such examples as compact disc or digitally broadcast video abound. Digitally signing the embedded signal with preprocessing of watermark data is more likely to prevent successful collusion. Depending on the media to be watermarked, highly granular watermarking algorithms are far more likely to successfully encode at a level below anything observable given quantization artifacts, common in all digitally-sampled media, than expectations that a baseline watermark has any functionality.

Furthermore, a "baseline" watermark as disclosed is quite subjective. It is simply described elsewhere in the art as the "perceptually significant" regions of a signal: so making a watermarking function less linear or inverting the insertion of watermarks would seem to provide the same benefit without the additional work required to create a "baseline" watermark. Indeed, watermarking algorithms should already be capable of defining a target insertion envelope or region without additional steps. Further, earlier disclosed applications by the present invention's inventor describe watermarking techniques that can be set to encode fewer bits than the available watermarking region's "bit-space" or encoding unrelated random noise in addition to watermark data to confuse possible collusive or other attempts at erasure. The region of "candidate bits" can be defined by any number of compression schemes or transformations, and the need to encode all of the bits is simply unnecessary. What is evident is that Leighton does not allow for initial prevention of attacks on an embedded watermark as the content is visibly or audibly unchanged. Moreover, encoding all of the bits may actually act as a security weakness to those who can replicate the regions with a knowledge of the encoding scheme. Again, security must also be offset outside of the actual watermark message to provide a truly robust and secure watermark implementation.

In contrast, the present invention may be implemented with a variety of cryptographic protocols to increase both confidence and security in the underlying system. A predetermined key is described as a set of masks. These masks may include primary, convolution and message delimiters but may extend into additional domains such as digital signatures of the message. In previous disclosures, the functionality of these masks is defined solely for mapping. Public and private keys may be used as key pairs to further increase the unlikeliness that a key may be compromised. Prior to encoding, the masks described above are generated by a cryptographically secure random generation process. A block cipher, such as DES, in combination with a sufficiently random seed value emulates a cryptographically secure random bit generator. These keys will be saved along with information matching them to the sample stream in question in a database for use in descrambling and subsequent detection or decode operation.

These same cryptographic protocols can be combined with embodiments of the present invention in administering streamed content that requires authorized keys to correctly display or play said streamed content in an unscrambled manner. As with digital watermarking, symmetric or asymmetric public key pairs may be used in a variety of implementations. Additionally, the need for certification authorities to maintain authentic key-pairs becomes a consideration for greater security beyond symmetric key implementations, where transmission security is a concern.

The following describes a sample embodiment of a system that protects digital information according to the present invention. Referring now in detail to the drawings wherein like parts are designated by like reference numerals throughout, there is illustrated in FIG. 1 a block flow diagram of a method for encoding digital information according to an embodiment of the present invention. An image is processed by "blocks," each block being, for example, a 32×32 pixel region in a single color channel. At step 110, each block is transformed into the frequency domain using a spectral transform or a Fast Fourier Transform (FFT). The largest 32 amplitudes are identified and a subset of these 32 are selected using the primary mask from the key at steps 120 and 130. One message bit is then encoded into each block at steps 140 and 150. The bit is chosen from the message using a transformation table generated using the convolution mask. If the bit is true, the selected amplitudes are reduced by a user defined strength fraction. If the bit is false, the amplitudes are unchanged.

Each of the selected amplitudes and frequencies are stored in the key. After all of the image has been processed, a diagonal stripe of pixels is saved in the key. This stripe can, for example, start in the upper left corner and proceed at a 45 degree angle through the image. The original dimensions of the image are also stored in the key.

Figure 2:
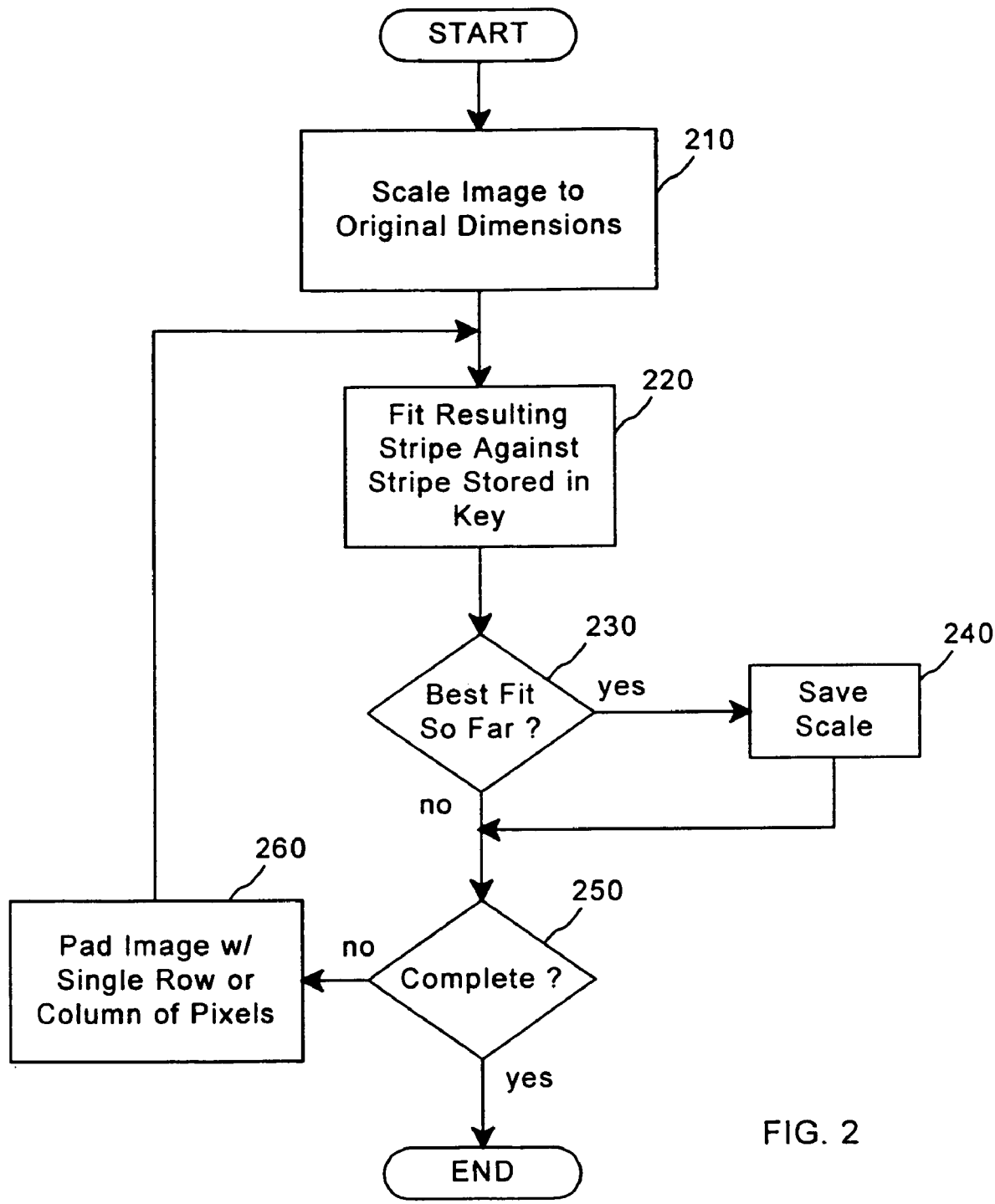
FIG. 2 is a block flow diagram of a method for descaling digital information according to an embodiment of the present invention.

FIG. 2 is a block flow diagram of a method for descaling digital information according to an embodiment of the present invention. When an image is chosen to be decoded, it first is checked to determine if it has been cropped and/or scaled. If so, the image is scaled to the original dimensions at step 210. The resulting "stripe," or diagonal line of pixels, is fit against the stripe stored in the key at step 220. If the fit is better than the previous best fit, the scale is saved at steps 230 and 240. If desired, the image can be padded with, for example, a single row or column of zero pixels at step 260 and the process can be repeated to see if the fit improves.

If a perfect fit is found at step 250, the process concludes. If no perfect fit is found, the process continues up to a crop "radius" set by the user. For example, if the crop radius is 4 the image can be padded up to 4 rows and/or 4 columns. The best fit is chosen and the image is restored to its original dimension, with any cropped area replaced by zeroes.

Figure 3:
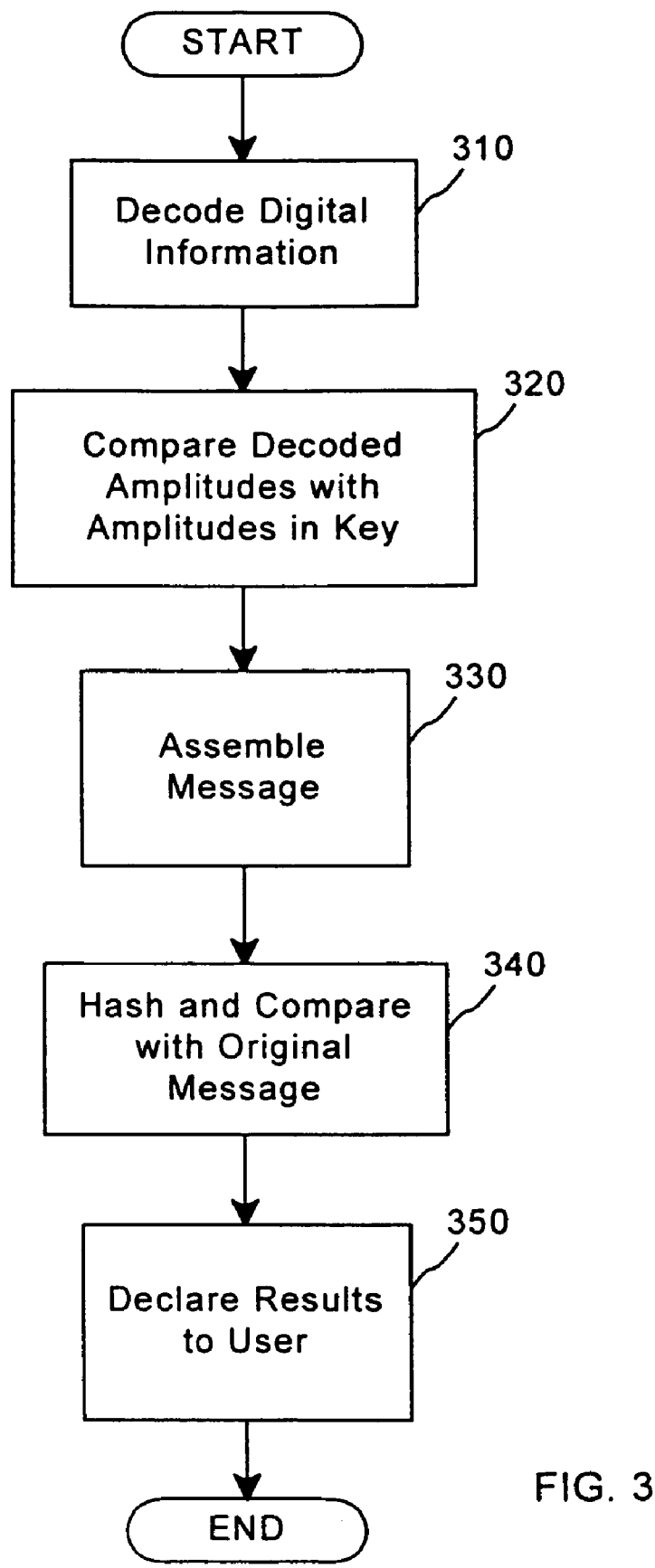
FIG. 3 is a block flow diagram of a method for decoding digital information according to an embodiment of the present invention.

Once the in formation has been descaled, it can be decoded according to an embodiment of the present invention shown in FIG. 3. Decoding is the inverse process of encoding. The decoded amplitudes are compared with the ones stored in the key in order to determine the position of the encoded bit at steps 310 and 320. The message is assembled using the reverse transformation table at step 330. At step 340, the message is then hashed and the hash is compared with the hash of the original message. The original hash had been stored in the key during encoding. If the hashes match, the message is declared valid and presented to the user at step 350.

Although various embodiments are specifically illustrated and described herein, it will be appreciated that modifications and variations of the present invention are covered by the above teachings and within the purview of the appended claims without departing from the spirit and intended scope of the invention. Moreover, similar operations have been applied to audio and video content for time-based manipulations of the signal as well as amplitude and pitch operations. The ability to descale or otherwise quickly determine differencing without use of the unwatermarked original is inherently important for secure digital watermarking. It is also necessary to ensure nonrepudiation and third part authentication as digitized content is exchanged over networks.

What is claimed is:

1. A method for descaling a digital image using a key, comprising the steps of:
    determining original dimensions of the digital image from the key;
    scaling the digital image to the original dimensions;
    obtaining a reference subset of pixels from the key; and
    comparing the reference subset of pixels with corresponding pixels in the scaled digital image.

2. The method of claim 1, wherein said step of comparing determines a first fit value based on the comparison, and wherein the method further comprises the steps of:
    padding the scaled digital image with an area of pad pixels; and
    re-comparing the reference subset of pixels with corresponding pixels in the padded image to determine a second fit value.

3. The method of claim 2, wherein the area of pad pixels is a row of single pixels.

4. The method of claim 2, wherein the area of pad pixels is a column of single pixels.

5. The method of claim 2, wherein said steps of padding and re-comparing are performed a predetermined number of times.

6. The method of claim 2, further comprising the step of choosing a best fit value among the determined fit values and restoring the digital image to the original size, including any pad pixels associated with the best fit value.

7. A method for descaling audio digital information using a key, comprising the steps of:
    determining original dimensions of the audio digital information from the key;
    scaling the audio digital information to the original dimensions;
    obtaining a reference subset of audio information from the key; and
    comparing the reference subset of audio information with corresponding information in the scaled audio information.

8. A method for descaling a digital signal using a key, comprising the steps of:
    determining original dimensions of the digital signal from the key;
    scaling the digital signal to the original dimensions;
    obtaining a reference signal portion from the key; and
    comparing the reference signal portion with a corresponding signal portion in the scaled signal.

* * * * *